United States Patent [19]
Geil et al.

[11] 3,727,206
[45] Apr. 10, 1973

[54] PERSONNEL-VEHICLE INTRUSION DETECTION SYSTEM

[75] Inventors: Fred G. Geil; Arthur Nelkin, both of Pittsburgh, Pa.

[73] Assignee: Westinghouse Electric Corporation, Pittsburgh, Pa.

[22] Filed: May 19, 1971

[21] Appl. No.: 144,724

[52] U.S. Cl.................................340/258 R, 340/272
[51] Int. Cl...............................................G08b 13/10
[58] Field of Search......................340/258 R, 258 D, 340/261, 272, 38, 258 C, 31 R

[56] References Cited

UNITED STATES PATENTS

| | | | |
|---|---|---|---|
| 3,480,912 | 11/1969 | Speeth et al. | 340/261 X |
| 2,594,276 | 4/1952 | Barker et al. | 340/38 R |
| 3,438,021 | 4/1969 | Nelkin et al. | 340/261 |
| 3,573,817 | 4/1971 | Akers | 340/258 R |

*Primary Examiner*—John W. Caldwell
*Assistant Examiner*—Glen R. Swann, III
*Attorney*—F. H. Henson, C. F. Renz and M. P. Lynch

[57] ABSTRACT

A perimeter intrusion detection system includes a pair of flexible tube members spaced apart and buried beneath the surface of the ground, coupled with transducer means to generate an electrical indication of changes in surface pressure attributable to personnel or vehicular movement across the surface of the ground. Electronic monitoring circuitry interprets these electrical indications generated by the transducers and generates electrical signals identifying the surface intrusion to be either that of personnel or vehicle. Electronic monitoring circuitry provides further discrimination of the vehicular intrusion by providing electrical indication of the direction, speed and weight of the intruding vehicle.

6 Claims, 2 Drawing Figures

PATENTED APR 10 1973                                    3,727,206

WITNESSES
Theodore F. Wrobel
James F. Young

INVENTORS
Fred G. Geil and
Arthur Nelkin
BY Michael P. Lynch
ATTORNEY

PERSONNEL-VEHICLE INTRUSION DETECTION SYSTEM

BACKGROUND OF THE INVENTION

A pressure sensitive security apparatus is disclosed and claimed in U.S. Pat. No. 3,438,021 issued Apr. 8, 1969 and assigned to the assignee of the present invention. A pair of fluid filled tubes positioned in a spaced apart relationship, typically of the order of 2 to 5 feet, is utilized to render the security apparatus insensitive to atmospheric and seismic disturbances while retaining sensitivity of local disturbances. Individual transducer means are operatively connected to each of the fluid filled tubes.

The theory of operation of the two tube systems is that a remote disturbance or change of atmospheric conditions will affect the transducer means associated with each tube similarly, and that by providing an electrical mixing circuit at the output of the transducer means, equal applied pressure to the two tubes will result in a net zero electrical output signal. In the event of a local disturbance, which results in an unequal applied pressure to the two tubes, the circuit will develop an electrical signal which is the function of the difference in the pressures applied to the two tubes. This signal is available for alarm indication. While the above U.S. Pat. discloses the use of separate transducer means with each of the fluid filled tubes, a single differential transducer coupled between the fluid filled tubes, as disclosed in copending U.S. Pat. application Ser. No. 113,999, filed Feb. 9, 1971, entitled "Differential Pressure Transducer" can be utilized to provide the identical function of the individual pressure transducers and associated electrical mixing circuit.

SUMMARY OF THE INVENTION

The electronic monitoring circuit coupled to the pressure transducer means associated with the fluid filled tubes includes a personnel detector circuit and a vehicle detector circuit. Due to the rather weak signals generated by the transducer means in response to the slight pressure changes resulting from personnel intrusion of a protected area, and the personnel detector circuit includes an amplifier coupled to a comparator type circuit. In the signal output from the amplifier circuit exceeds a predetermined threshold limit thereby indicating personnel intrusion, the comparator circuit generates an output intrusion alarm signal. The vehicle detector circuit is connected to the transducer means in advance of the amplifier circuit inasmuch as the vehicle detection will result in a significant transducer output signal which in most cases will result in saturation of the amplifier circuit. The vehicle detector circuit likewise includes a comparator circuit which produces an intrusion alarm output signal when the signal generated by the transducer means exceeds a predetermined threshold level significantly greater than the personnel threshold level.

Separate comparator circuits can be employed to monitor the output of each of the transducer means coupled to the individual fluid filled tubes and the output of these comparator circuits utilized to measure the speed of a vehicle by observing the elapsed time between the output signals of the individual transducers. Furthermore the sequence of actuation of the individual comparator circuits can be employed to determine the direction of travel of an intruding vehicle. An additional piece of information, i.e., namely the approximate weight of the vehicle can be directly determined from the amplitude of the signals generated by the transducer means.

DESCRIPTION OF THE DRAWINGS

The invention will become more readily apparent from the following exemplary description in connection with the accompanying drawings.

DESCRIPTION OF THE PREFERRED EMBODIMENT

Figure 1:
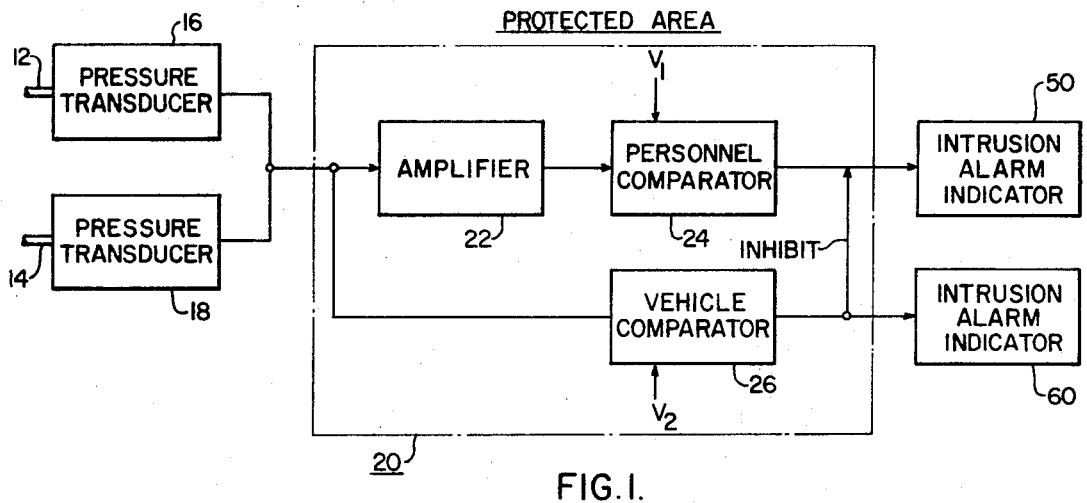
FIG. 1 is a block diagram schematic of a basic embodiment of the invention.

Referring to FIG. 1 there is illustrated diagrammatically a pressure sensitive security apparatus 10 concealed beneath the surface of the earth providing intrusion detection of a Protected Area. The security apparatus 10 comprises essentially a pair of fluid filled tubes 12 and 14 and pressure transducers 16 and 18, respectively, connected thereto. The tubes 12 and 14 are composed of compliant material such as rubber and each tube is filled with a gas or an incompressible liquid. An electronic monitoring circuit 20 is operatively connected to the outputs of the pressure transducers 16 and 18 and functions to generate output signals to actuate personnel intrusion alarm circuit 50 in response to personnel intrusion of the Protected Area and output signals to actuate vehicle intrusion detection alarm circuit 60 in response to vehicle intrusion of the Protected Area.

The electronic monitoring circuitry 20 of FIG. 1 includes an amplifier circuit 22 for amplifying the rather weak intrusion signals produced by personnel intrusion and supplying the amplified signals as input signals to the personnel comparator circuit 24. The personnel comparator circuit 24 functions to transmit an output signal to the intrusion alarm indicator circuit 50 when the input signal provided by the amplifier circuit 22 exceeds a predetermined threshold voltage level $V_1$. The magnitude of the threshold voltage $V_1$ is sufficient to prevent erroneous comparator circuit output signals which may result from extraneous electrical signals present at the input of the comparator circuit 24. The net intrusion electrical signal produced at the input of the amplifier circuit 22 by the pressure transducers 16 and 18 is also supplied as an input signal to a vehicle comparator circuit 26. The transducer signals produced by vehicle intrusion are of sufficient magnitude as to not require further amplification. Therefore vehicle intrusion signals are monitored at the input of the amplifier circuit 22 rather than the output in order to avoid saturating the amplifier circuit 22 with high level vehicle intrusion signals and to prevent the subsequent loss of vehicle-personnel intension discrimination which would occur as a result of amplifier saturation. Vehicle comparator circuit 26 transmits an output signal to intrusion alarm indicator circuit 60 when the intrusion signal present at the vehicle comparator circuit 26 exceeds a predetermined threshold voltage $V_2$.

The magnitude of the threshold voltage $V_2$ is significantly greater than the magnitude of threshold voltage $V_1$ thus preventing erroneous actuation of the intrusion alarm indicator circuit 60 resulting from the presence of a personnel intrusion signal at the input of the amplifier circuit 22. Further discrimination between personnel and vehicular intrusion may be provided by supplying the output signal of the vehicle comparator circuit 26 as an inhibit signal to the personnel comparator circuit 24 thereby preventing actuation of the personnel alarm indicator circuit 50 in response to a detected vehicle intrusion.

Figure 2:
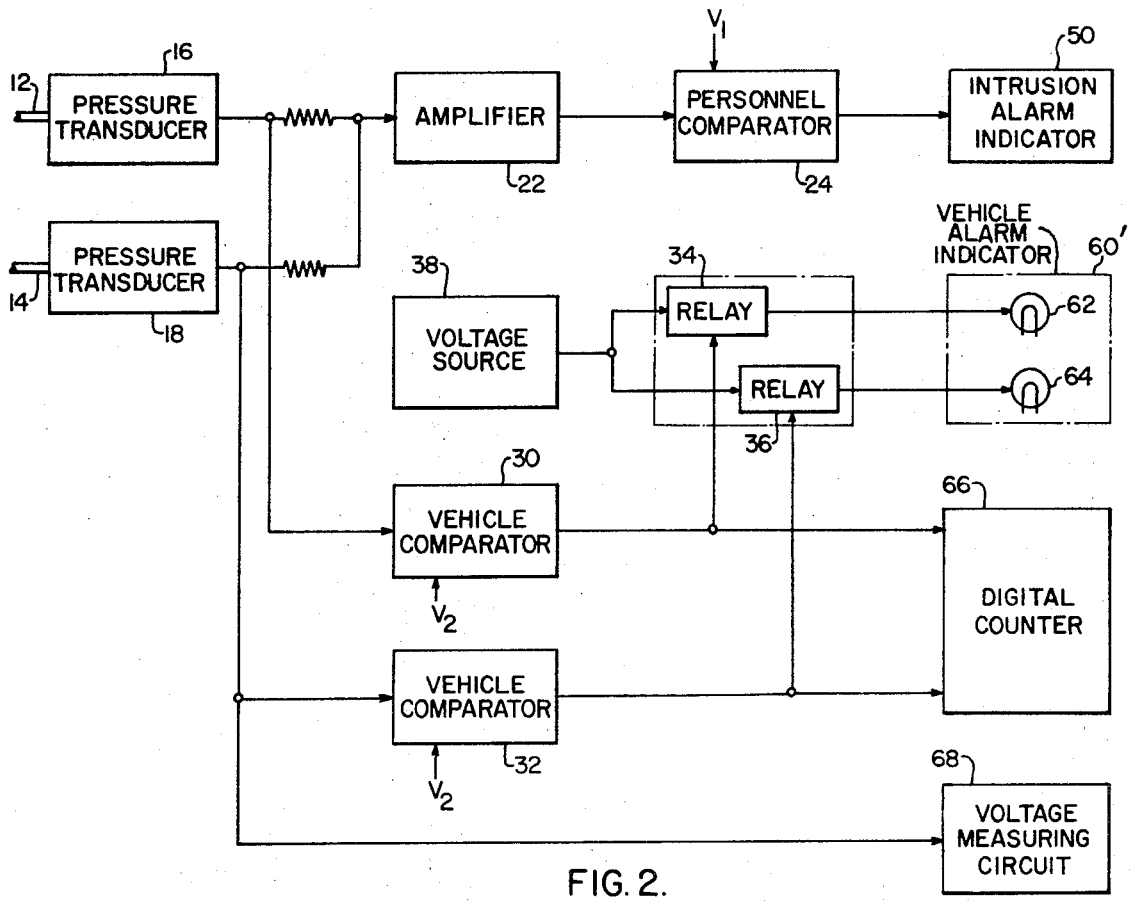
FIG. 2 is a block diagram schematic of the embodiment disclosed in FIG. 1 further implemented to provide additional information relating to the vehicle intrusion.

Numerous techniques may be employed to provide additional information relating to the speed, direction of travel and weight of a vehicle passing through the Protected Area. One technique for providing such information is schematically illustrated in FIG. 2.

In addition to personnel detection circuitry comprised of the amplifier circuit 22, the personnel comparator circuit 24 and the intrusion alarm indicator circuit 50, the electronic monitoring circuit 20 includes two vehicle comparator circuits 30 and 32. Vehicle comparator circuits 30 and 32 are operatively connected to the outputs of the individual pressure transducers 16 and 18, respectively, and function to generate output signals when the signal of the associated pressure transducer exceeds the threshold level $V_2$. Relay type circuits 34 and 36 are operatively connected to the outputs of the vehicle comparator circuits 30 and 32 respectively and respond to the outputs of the respective comparator circuits by applying voltage from the voltage source 38 to vehicle alarm indicator circuit 60 to energize the appropriate vehicle intrusion lamp 62 or 64. Sequential energization of the lamps 62 and 64 produced by sequential output signals from vehicle comparator circuits 30 and 32 is indicative of not only a vehicle intrusion but is also indicative of the direction of travel of the vehicle.

The approximate rate of travel of an intruding vehicle can most simply be determined by utilizing the first of the sequential outputs of the vehicle comparator circuits 30 and 32 to activate a digital counter 66 and the second of the sequential outputs of the vehicle comparator circuits to deactivate the digital counter 66. The digital count in turn can be interpreted in terms of rate of travel of the vehicle. An alternate technique for determining rate of travel would be the use of a bistable circuit which responded to the sequential outputs of the comparator circuits by generating a pulse, the duration of which is equivalent to 1/velocity.

An approximate indication of the weight of the vehicle passing through the protected area can be provided by a voltage measuring circuit 68 which monitors the amplitude of the output signal from pressure transducer 18.

We claim as our invention:

1. In a personnel-vehicle intrusion detection system, the combination of, a first and second fluid-filled compliant tube means disposed beneath the surface of the ground in a spaced apart relationship and including a first and second pressure transducer means associated with said first and second tube means to generate first and second electrical output signals indicative of pressure applied to said first and second fluid filled tube means respectively, a first means responding to said first and second electrical output signals by generating an amplified output signal indicative of the net differential pressure between said first and second fluid filled tubes, a second means for generating a personnel intrusion alarm signal when a predetermined relationship exists between said amplified output signal and a first reference signal, a third means responding to the output of said first pressure transducer means by generating a first vehicle intrusion signal when a predetermined relationship exists between said electrical output signal from said first pressure transducer means and a second reference signal, a fourth means responding to the output of said second pressure transducer means by generating a second vehicle intrusion signal when a predetermined relationship exists between the electrical output of said second transducer means and said second reference signal.

2. In a personnel-vehicle intrusion detection system as claimed in claim 1 including circuit means for responding to the sequence of occurrence of output signals from said third and fourth means to determine the direction of travel of an intruding vehicle.

3. In a personnel-vehicle intrusion detection system as claimed in claim 1, including vehicle rate of travel circuit means responding to the time lapse between the occurrence of output signals from said third and fourth means to determine the rate of travel of an intruding vehicle.

4. In a personnel-vehicle intrusion detection system as claimed in claim 1, including, a weight detecting circuit means responding to the amplitude of said electrical output signal from said first pressure transducer means to determine the approximate weight of an intruding vehicle.

5. In an intrusion detection system capable of discriminating between personnel and vehicle intrusions of a protected area, the combination of, transducer means positioned for operatively responding to intrusion of the protected area by an object by producing an output signal which is a function of the weight of the intruding object, first means for producing a first and second reference signal, and second means operatively connected to said transducer means and said first means for producing an output indication of an intrusion of the protected area by a person if the output signal from said transducer means equals or exceeds said first reference signal and an output indication of intrusion of the protected area by a vehicle if said output signal from said transducer means equals or exceeds both said first and second reference signals.

6. A method for discriminating between the intrusion of a protected area by personnel and vehicles, including the steps of, weighing objects entering the protected area and producing an output indication of said weight, developing a first reference indicative of the weight of a person, developing a second reference indicative of the weight of a vehicle, and comparing the weight of the object entering said protected area with said first and second reference to determine if said object is a person or a vehicle.

* * * * *